US012756651B2

(12) United States Patent
Zhang

(10) Patent No.: US 12,756,651 B2
(45) Date of Patent: Oct. 6, 2026

(54) BIT INDEX EXPLICIT REPLICATION (BIER) WITH ANYCAST

(71) Applicant: Juniper Networks, Inc., Sunnyvale, CA (US)

(72) Inventor: Zhaohui Zhang, Westford, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 11 days.

(21) Appl. No.: 18/372,591

(22) Filed: Sep. 25, 2023

(65) Prior Publication Data

US 2024/0214296 A1 Jun. 27, 2024

Related U.S. Application Data

(60) Provisional application No. 63/434,855, filed on Dec. 22, 2022.

(51) Int. Cl.

| | |
|---|---|
| ***H04L 45/02*** | (2022.01) |
| ***H04L 45/00*** | (2022.01) |
| ***H04L 45/16*** | (2022.01) |
| ***H04L 45/74*** | (2022.01) |
| ***H04L 45/748*** | (2022.01) |
| ***H04L 47/80*** | (2022.01) |
| ***H04L 61/5069*** | (2022.01) |
| ***H04L 65/611*** | (2022.01) |

(52) U.S. Cl.

CPC .............. *H04L 45/02* (2013.01); *H04L 45/16* (2013.01); *H04L 45/32* (2013.01); *H04L 45/74* (2013.01); *H04L 45/748* (2013.01); *H04L 47/806* (2013.01); *H04L 61/5069* (2022.05); *H04L 65/611* (2022.05)

(58) Field of Classification Search

CPC ....... H04L 45/02; H04L 45/32; H04L 45/748; H04L 47/806; H04L 61/5069; H04L 65/611; H04L 12/1886; H04L 45/74; H04L 45/16

USPC .......................................................... 709/238

See application file for complete search history.

(56) References Cited

U.S. PATENT DOCUMENTS

2020/0228360 A1* 7/2020 Wijnands ............ H04L 12/1886
2022/0224633 A1* 7/2022 Xie ....................... H04L 45/741

FOREIGN PATENT DOCUMENTS

EP 4 224 817 A1 8/2023
WO WO 2022/088967 A1 5/2022

OTHER PUBLICATIONS

BIER with Anycast. Z. Zhang. Sep. 12, 2023. IETF BIER Working Group https://www.ietf.org/archive/id/draft-zzhang-bier-anycast-02.html.*

Multicast Using Bit Index Explicit Replication (BIER). IETF RFC 8279. Nov. 2017.*

(Continued)

*Primary Examiner* — Tan Doan
(74) *Attorney, Agent, or Firm* — Pokotylo Patent Services

(57) ABSTRACT

BIER architecture currently does not support anycast, in that each BIER Forwarding Router (BFR) has its own unique BFR-prefix and BFR-ID. BIER signaling protocols also check if there are duplicate BFR-IDs advertised. Anycast support with BIER is described. The description updates (e.g., relaxes and/or removes some requirements of) RFC 8279, RFC 8401, and RFC 8444.

20 Claims, 12 Drawing Sheets

300

(56) References Cited

OTHER PUBLICATIONS

Vocabulary.com defines: common (adjective) having no special distinction or quality; widely known or commonly encountered; average or ordinary or usual. https://www.vocabulary.com/dictionary/common.*

Extended European Search Report (EESR) from counterpart European Patent Application Serial No. 23219022.3-1213, dated Mar. 14, 2024.

Wijnands, IJ., Ed., Rosen, E., Ed., Dolganow, A., Przygienda, T., and S. Aldrin, "Multicast Using Bit Index Explicit Replication (BIER)", *Request for Comments:* 8279, DOI 10.17487/RFC8279, (Internet Engineering Task Force, Nov. 2017).

Article 94(3) Communication from the European Patent Office in counterpart European application 23219022.3-1218, dated Jul. 17, 2025.

J. Xie et al., "BIER Deployment and Operation: Challenges and Solution Approaches," *draft-xie-mboned-bier-deploy-00* (Internet Engineering Task Force, Oct. 23, 2021).

* cited by examiner

200

300

400

500

800

BIT INDEX EXPLICIT REPLICATION (BIER) WITH ANYCAST

§ 1. RELATED APPLICATION(S)

This application claims the benefit of U.S. Provisional Application No. 63/434,855 (referred to as "the '855 provisional" and incorporated herein by reference), titled "BIER with Anycast," filed on Dec. 22, 2022, and listing Zhaohui ZHANG as the inventor. The scope of the invention is not limited to any requirements of the specific embodiments in the '855 provisional.

§ 2. BACKGROUND

§ 2.1 Field of the Invention

The present application concerns communications networks, and more specifically, concerns improvements to the Bit Index Explicit Replication (BIER) protocol.

§ 2.2 Background Information

The Bit Index Explicit Replication (BIER) protocol, and extensions to the BIER protocol, are described in the following Request for Comments (RFCs) published by the Internet Engineering Task Force (IETF):

Wijnands, I J., Ed., Rosen, E., Ed., Dolganow, A., Przygienda, T., and S. Aldrin, "Multicast Using Bit Index Explicit Replication (BIER)", RFC 8279, DOI 10.17487/RFC8279, (IETF, November 2017), available at https://www.rfc-editor.org/info/rfc8279 (Referred to as "RFC 8279" and incorporated herein by reference.);

Ginsberg, L., Ed., Przygienda, T., Aldrin, S., and Z. Zhang, "Bit Index Explicit Replication (BIER) Support via IS-IS", RFC 8401, DOI 10.17487/RFC8401, (IETF, June 2018), available at https://www.rfc-editor.org/info/rfc8401 (Referred to as "RFC 8401" and incorporated herein by reference);

Psenak, P., Ed., Kumar, N., Wijnands, I J., Dolganow, A., Przygienda, T., Zhang, J., and S. Aldrin, "OSPFv2 Extensions for Bit Index Explicit Replication (BIER)", RFC 8444, DOI 10.17487/RFC8444, (IETF, November 2018), available at https://www.rfc-editor.org/info/rfc8444 (Referred to as "RFC 8444" and incorporated herein by reference.); and Z. Zhang, A. Przygienda, A. Dolganow, H. Bidgoli, I J. Wijnands, A. Gulko, "Underlay Path Calculation Algorithm and Constraints for Bit Index Explicit Replication (BIER)", RFC 9272 (IETF, September 2022), available at https://www.rfc-editor.org/rfc/rfc9272.txt (Referred to as "RFC 9272" and incorporated herein by reference.)

Although the BIER protocol is well-understood by those having ordinary skill in the art, BIER is introduced here for the reader's convenience. RFC 8279 specifies a new architecture for the forwarding of multicast data packets. The architecture provides optimal forwarding of multicast data packets through a "multicast domain". However, it does not require the use of a protocol for explicitly building multicast distribution trees, and it does not require intermediate nodes to maintain any per-flow state.

A router that supports BIER is known as a "Bit-Forwarding Router" (BFR). The BIER control-plane protocols run within a "BIER domain", allowing the BFRs within that domain to exchange the information needed for them to forward packets to each other using BIER.

A multicast data packet enters a BIER domain at a "Bit-Forwarding Ingress Router" (BFIR), and leaves the BIER domain at one or more "Bit-Forwarding Egress Routers" (BFERs). A BFR that receives a multicast data packet from another BFR in the same BIER domain, and forwards the packet to another BFR in the same BIER domain, is known as a "transit BFR" for that packet. A single BFR may be a BFIR for some multicast traffic while also being a BFER for some multicast traffic and a transit BFR for some multicast traffic. In fact, for a given packet, a BFR may be a BFIR and/or a transit BFR and/or (one of) the BFER(s) for that packet.

A BIER domain may contain one or more sub-domains. Each BIER domain contains at least one sub-domain, the "default sub-domain" (also denoted "sub-domain 0"). If a BIER domain contains more than one sub-domain, each BFR in the domain is provisioned to know the set of sub-domains to which it belongs. Each sub-domain is identified by a sub-domain-id in the range [0,255].

For each sub-domain to which a given BFR belongs, if the BFR is capable of acting as a BFIR or a BFER, it is provisioned with a "BFR-ID" that is unique within the sub-domain. A BFR-ID is a small unstructured positive integer. For instance, if a particular BIER sub-domain contains 1,374 BFRs, each one could be given a BFR-ID in the range [1,1374].

If a given BFR belongs to more than one sub-domain, it may (though it need not) have a different BFR-ID for each sub-domain.

When a multicast packet arrives from outside the domain at a BFIR, the BFIR determines the set of BFERs to which the packet will be sent. The BFIR also determines the sub-domain in which the packet will be sent. Determining the sub-domain in which a given packet will be sent is known as "assigning the packet to a sub-domain". Once a particular packet has been assigned to a particular sub-domain, it remains assigned to that sub-domain until it leaves the BIER domain. That is, the sub-domain to which a packet is assigned is not changed while the packet is in flight through the BIER domain.

Once the BFIR determines the sub-domain and the set of BFERs for a given packet, the BFIR encapsulates the packet in a "BIER header". FIG. 1 illustrates an example packet 100 for forwarding in a BIER domain or sub-domain. The example packet 100 includes a label 110, such as an MPLS label for example, for identifying a set number and a sub-domain number. The example packet 100 also includes a BIER bitmask 120 in which each bit represents a single BFR-ID, and in which each bit set to "1" corresponds to one or more BFRs (e.g., one or more BFERs) to which the encapsulated payload 130 is to be transported. FIG. 2 illustrates a simplified example in which BFRs (e.g., BFIRs and/or BFERs) are assigned a unique bit position as a BFR-ID. More specifically, in FIG. 2, BFR router 1 210 is assigned BFR-ID=00001 (that is, first bit position of a 5-bit binary Bitstring set to "1") and a BFR-prefix (e.g., corresponding to its loopback address), BFR router 2 220 is assigned BFR-ID=00010 (that is, second bit of the position set of the 5-bit binary Bitstring to "1") and a BFR-prefix,), BFR router 3 230 is assigned BFR-ID=00100 (that is, third bit position of the 5-bit binary Bitstring set to "1") and a BFR-prefix), BFR router 4 240 is assigned BFR-ID=01000 (that is, fourth bit position of the 5-bit binary Bitstring set to "1") and a BFR-prefix, and), BFR router 5 250 is assigned BFR-ID=10000 (that is, fifth bit position of the 5-bit binary Bitstring set to "1") and a BFR-prefix. Each BFR-ID for a given BFR is mapped to a BFR-prefix associated with the BFR. To indicate that a particular BFER is to receive a given packet, the BFIR sets the bit corresponding to that BFER's BFR-ID within the Bitstring in the sub-domain to which the packet has been assigned. The term "Bitstring" refers to the BitString field in the BIER header. The term "payload" refers to the packet that has been encapsulated by the BIER header. (Recall, e.g., 130 of FIG. 1.) Thus, a "BIER-encapsulated" packet includes a "BIER header" followed by a "payload".

The number of BFERs to which a given packet can be forwarded is limited only by the length of the BitString in the BIER header. Different deployments can use different BitString lengths. The term "BitStringLength" refers to the number of bits in the BitString. To accommodate possible deployments that have more BFERs in a given sub-domain than there are bits in the BitString, the BIER encapsulation includes both the BitString and a "Set Identifier" (SI). It is the BitString and the SI together that determine the set of BFERs to which a given packet will be delivered.

With the forwarding procedure specified in RFC 8279, a multicast data packet can follow an optimal path from its BFIR to each of its BFERs. Further, since the set of BFERs for a given packet is explicitly encoded into the BIER header, the packet is not sent to any BFER that does not need to receive it. This permits optimal forwarding of multicast traffic. This forwarding is achieved without any need for transit BFRs to maintain per-flow state or to run a multicast tree-building protocol. Furthermore, since BIER encodes each BFR-ID as a single bit in a BitString, it can represent up to 128 BFERs in the same number of bits that it would take to carry the IPV6 address of a single BFER. Thus, BIER scales to a much larger number of egress nodes per packet.

BIER does not require that each transit BFR look up the best path to each BFER that is identified in the BIER header. The number of lookups required in the forwarding path for a single packet can be limited to the number of neighboring BFRs. This can be much smaller than the number of BFERs.

Per RFC 8279, each BFR must be assigned a single "BFR-prefix" for each sub-domain to which it belongs. A BFR's BFR-prefix is an IP address (either IPv4 or IPV6) of the BFR. RFC 8279 recommends that the BFR-prefix be a loopback address of the BFR. If a BFR belongs to more than one sub-domain, it may (though it need not) have a different BFR-prefix in each sub-domain. All BFR-prefixes used within a given sub-domain belong to the same address family (either IPv4 or IPv6). Per RFC 8279, the BFR-prefix of a given BFR in a given sub-domain must be routable in that sub-domain. (Whether a particular BFR-prefix is routable in a given sub-domain depends on the "routing underlay" (described below) associated with that sub-domain.)

A "BFR Identifier" (BFR-ID) is a number in the range {1-65535}. Per RFC 8279, within a given sub-domain, every BFR that may need to function as a BFIR or BFER must have a single BFR-ID, which identifies it uniquely within that sub-domain. A BFR that does not need to function as a BFIR or BFER in a given sub-domain does not need to have a BFR-ID in that sub-domain.

Section 3 of RFC 8279 describes encoding a BFR-ID in a BIER data packet by converting the BFR-ID to an SI and a BitString, using the parameter "BitStringLength".

One may think of the BIER architecture as consisting of three layers: (1) the "routing underlay", (2) the "BIER layer", and (3) the "multicast flow overlay". The "routing underlay" establishes "adjacencies" between pairs of BFRs and determines one or more "best paths" from a given BFR to a given set of BFRs. At a given BFR, say BFR-A, for every IP address that is the address of a BFR in the BIER domain, the routing underlay will map that IP address into a set of one or more "equal-cost" adjacencies. If a BIER data packet has to be forwarded by BFR-A to a given BFER, say BFER-B, the packet will follow the path from BFR-A to BFER-B that is determined by the routing underlay.

In a typical deployment, the routing underlay is often the default topology that the Interior Gateway Protocol (IGP), e.g., open shortest path first (OSPF), uses for unicast routing. In that case, the underlay adjacencies are just the OSPF adjacencies. That is, a BIER data packet traveling from BFR-A to BFER-B will follow the path that OSPF has selected for unicast traffic from BFR-A to BFER-B. If one wants to have multicast traffic from BFR-A to BFER-B travel a path that is different from the path used by the unicast traffic from BFR-A to BFER-B, one can use a different routing underlay.

The BIER layer includes the protocols and procedures that are used in order to transmit a multicast data packet across a BIER domain, from its BFIR to its BFERs. This includes the following components: (1) protocols and procedures that a given BFR uses to advertise, to all other BFRs in the same BIER domain (e.g., its BFR-prefix; its BFR-ID in each sub-domain for which it has been provisioned with a BFR-ID; the set of Disposition BitStringLengths it has been provisioned to use for each sub-domain; optionally, information about the routing underlay associated with each sub-domain); (2) the procedures used by a BFIR to impose a BIER header on a multicast data packet; (3) the procedures for forwarding BIER-encapsulated packets and for modifying the BIER header during transit; and (4) the procedures used by a BFER to decapsulate a BIER packet and properly dispatch it.

Finally, the "multicast flow overlay" includes the set of protocols and procedures that enable (1) a BFIR, when it receives a multicast data packet from outside the BIER domain, to determine the set of BFERs for that packet, and (2) a BFER, when it receives a BIER-encapsulated packet from inside the BIER domain, to determine how to further forward the packet.

As noted above, each BFER is assigned (by provisioning) a BFR-ID (for a given BIER sub-domain). Each BFER advertises these assignments to all the other BFRs in the domain. Similarly, each BFR is assigned (by provisioning) a BFR-prefix (for a given BIER domain) and advertises this assignment to all the other BFRs in the domain. Finally, each BFR has been provisioned to use a certain set of Disposition BitStringLengths for each sub-domain and advertises (e.g., using flooding) these to all other BFRs in the domain.

RFC 8401 and RFC 8444 specify extensions to enable the above advertisements. Importantly, RFC 8279 specifies that each BFR needs to have a unique (in each sub-domain) BFR-ID. Consequently, RFC 8279 specifies that two different BFRs will not advertise ownership of the same <sub-domain-ID, BFR-ID> unless there has been a provisioning error, and notes that if a given BFR determines that two other BFRs have both advertised the same BFR-ID for the same sub-domain, the given BFR must log an error. Similarly, RFC 8279 notes that if a given BFR has been provisioned with a particular BFR-ID for a particular sub-domain but that it has not yet advertised its ownership of that particular BFR-ID for that particular sub-domain, if that particular BFR has received an advertisement from a different BFR that is advertising ownership of same BFR-ID for the same sub-domain, the given BFR-A should log an error and will not advertise its own ownership of particular BFR-ID for that sub-domain (as long as the received advertisement from the other BFR is extant). The present inventor has recognized some limitations caused by these existing requirements of BIER.

More specifically, the present inventor has recognized that the BIER architecture currently does not support anycast (See, e.g., prior Anycast documents, such as, for example, C. Partridge, T. Mendez, W. Milliken, "Host Anycasting Service", RFC 1546 (IETF, November 1993), available at https://datatracker.ietf.org/doc/html/rfc1546 (Referred to as "RFC 1546" and incorporated herein by reference), R. Hinden, S. Deering, "IP Version 6 Addressing Architecture", RFC 4291 (IETF, February 2006), available at https://datatracker.ietf.org/doc/html/rfc4291 (Referred to as "RFC 4291" and incorporated herein by reference), and J. Abley, K. Lindqvist, "Operation of Anycast Service", RFC 4786 (IETF, December 2006), available at https://www.rfc-editor.org/rfc/rfc4786.txt (Referred to as "RFC 4786" and incorporated herein by reference)), in that each BIER Forwarding Router (BFR) has its own unique BIER-prefix and BFR-ID. BIER signaling protocols RFC8401 and RFC8444 require the checking for, and logging of, duplicate BFR-IDs in advertisements, and require duplicate BFR-IDs be treated as zero and ignored. That is, under the existing RFCs related to BIER and cited above, those BFRs advertising duplicate BFR-IDs will not be treated as BIER Forwarding Ingress Routers (BFIR) or BIER Forwarding Egress Routers (BFER).

However, anycast is widely used in networks and the present inventor believes that would be useful to support BFERs with anycast addresses as BFR-prefixes, especially for egress protection purposes.

§ 3. SUMMARY OF THE INVENTION

Example embodiments consistent with the present description enable the use of anycast with BIER by providing (e.g., configuring) a BIER sub-domain comprising at least two BIER forwarding routers (BFRs) configured with a common, non-zero, BIER forwarding router (BRF) identifier (BFR-ID) (for the BIER sub-domain) associated with a common BFR-prefix. In some example implementations, one or more of the BFRs is a BIER forwarding egress router (BFER).

Example embodiments consistent with the present description enable the use of anycast with BIER by providing method for use by a BFR in a BIER sub-domain, the computer-implemented method comprising: (a) receiving, by the BFR, at least one advertisement collectively having a common, non-zero, BFR-ID for the BIER sub-domain, associated with a common BRF-prefix shared by at least two different BFRs in the BIER sub-domain; and (b) processing the at least one advertisement in a manner that does not treat the common BFR-ID for the BIER sub-domain, associated with a common BFR-prefix as a duplicate even though it is shared by a least two different BFRs in the BIER sub-domain.

In some such example methods, the act of processing the at least one advertisement in a manner that does not treat the common BFR-ID for the BIER sub-domain, associated with a common BFR-prefix as a duplicate even though it is shared by a least two different BFRs in the BIER sub-domain, includes using, by the BFR, the common, non-zero, BFR-ID and the common BFR-prefix shared by the at least two different BFRs belonging to the BIER sub-domain to calculate BIER routes to the any one of the at least two different BFRs sharing the common, non-zero, BFR-ID and the common BFR-prefix. In some such example methods, the act of processing the at least one advertisement in a manner that does not consider the common BFR-ID associated with a common BFR-prefix as a duplicate even though it is shared by a least two different BFRs in the same sub-domain, further includes generating a bit index forwarding table (BIFT) from the BIRT, and the method further includes: receiving, by the BFR, a packet including a label identifying the sub-domain, a destination bit mask, and a payload, wherein the destination bit mask includes a bit-position corresponding to the BFR-ID set to "1"; and forwarding, by the BFR and using the BIFT, the packet.

Example embodiments consistent with the present description enable the use of anycast with BIER by providing method for use in a BIER sub-domain, the computer-implemented method comprising: (a) generating, by a first BFR in the BIER subdomain, at least one first advertisement collectively having a non-zero BFR-ID for the BIER sub-domain, associated with a BRF-prefix belonging to the BIER sub-domain; (b) transmitting, by the first BFR, the at least one first advertisement to another BFR in the BIER sub-domain; (c) generating, by a second BFR in the BIER subdomain, at least one second advertisement collectively having the non-zero BIER forwarding router (BRF) identifier (BFR-ID) for the BIER sub-domain, associated with the BRF-prefix belonging to the BIER sub-domain; and (d) transmitting, by the second BFR, the at least one second advertisement to another BFR in the BIER sub-domain. In some such example methods, each of the first BFR and the second BFR is an egress BFR (BFER). In some such implementations, the acts of (1) generating, by a first BFR in the BIER subdomain, at least one first advertisement collectively having a non-zero BFR-ID for the BIER sub-domain, associated with a BFR-prefix belonging to the BIER sub-domain, and (2) transmitting, by the first BFR, the at least one first advertisement to another BFR in the BIER sub-domain, are performed regardless of whether or not the first BFR had previously received an advertisement from another BFR in the BFR sub-domain having the non-zero BFR-ID for the BIER sub-domain, associated with the BFR-prefix. In some such example methods, the act of transmitting, by the first BFR, the at least one first advertisement to another BFR in the BIER sub-domain, uses flooding (e.g., using an interior gateway protocol (IGP)).

Any of the example methods described may be implemented on a BFR in a BIER sub-domain, the BFR comprising: (a) a least one processor; and (b) a non-transitory storage device storing processor-executable instructions which, when executed by the at least one processor, cause the at least one processor to perform any of the methods described.

A non-transitory storage device may be provided to store processor-executable instructions which, when executed by at least one processor of a BFR in a BIER sub-domain, cause the at least one processor to perform any of the methods described.

An example BIER subdomain includes first and second BFRs, each including at least one corresponding processor, and (ii) a corresponding non-transitory storage device storing processor-executable instructions. The first BFR: (a) generates at least one first advertisement collectively having a non-zero BFR-ID for the BIER sub-domain, associated with a BRF-prefix belonging to the BIER sub-domain; and (b) transmits the at least one first advertisement to another BFR in the BIER sub-domain. Similarly, the second BFR: (a) generates at least one second advertisement collectively having the non-zero BFR-ID for the BIER sub-domain, associated with the BRF-prefix belonging to the BIER sub-domain; and (b) transmits the at least one second advertisement to another BFR in the BIER sub-domain. In some implementations, each of the first BFR and the second BFR is an egress BFR (BFER). In some implementations, the acts of (1) generating, by a first BFR in the BIER subdomain, at least one first advertisement collectively having a non-zero BFR-ID for the BIER sub-domain, associated with a BFR-prefix belonging to the BIER sub-domain, and (2) transmitting, by the first BFR, the at least one first advertisement to another BFR in the BIER sub-domain, are performed regardless of whether or not the first BFR had previously received an advertisement from another BFR in the BFR sub-domain having the non-zero BFR-ID for the BIER sub-domain, associated with the BFR-prefix. In some implementations, the act of transmitting, by the first BFR, the at least one first advertisement to another BFR in the BIER sub-domain, uses flooding (e.g., using an interior gateway protocol (IGP)).

§ 4. BRIEF DESCRIPTION OF THE DRAWINGS

§ 5. DETAILED DESCRIPTION

The present disclosure may involve novel methods, apparatus, message formats, and/or data structures that support anycast in a BIER environment (e.g., a BIER sub-domain). The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventor regards his invention as any patentable subject matter described.

The present description updates (relaxes or removes requirements in) RFC 8279, RFC 8401, and/or RFC 8444 to allow BFERs advertise anycast addresses as BFR-prefixes, and to allow such advertisements to be appropriately processed and used in routing and forwarding operations.

§ 5.1 Example Configured Bier Subnetwork

Figure 3:
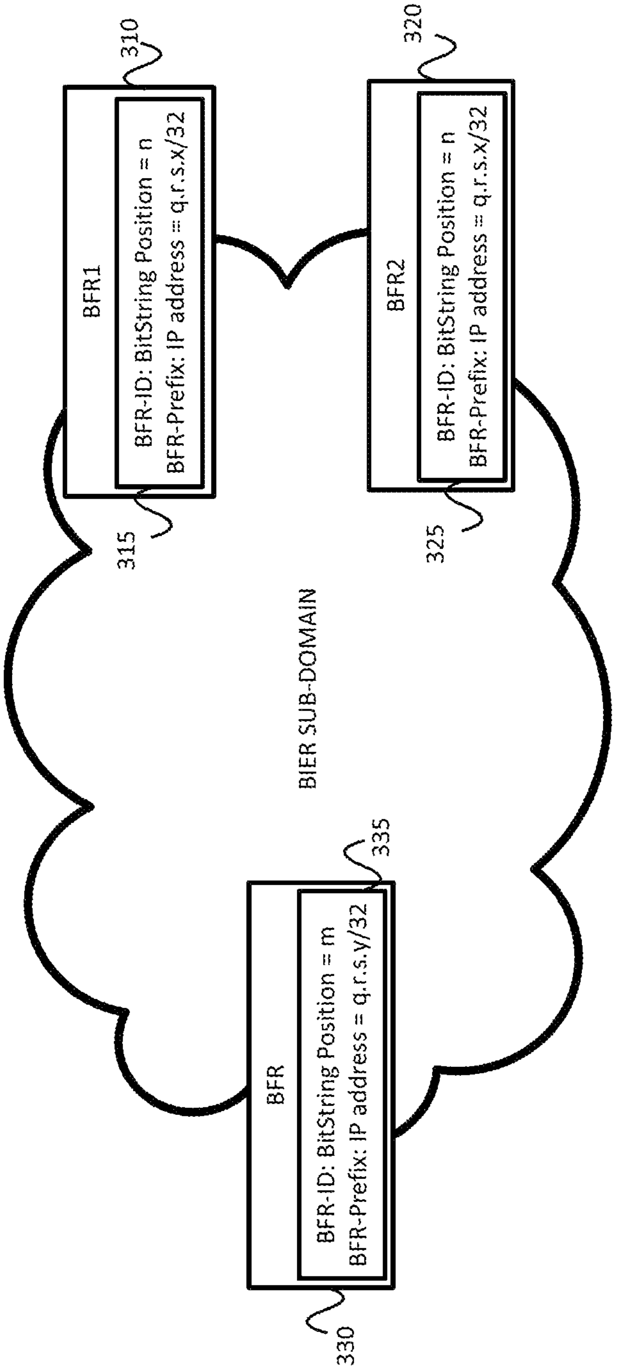
FIG. 3 is a simplified diagram illustrating an example BIER sub-domain having at least two BFRs configured in a manner consistent with the present description.

FIG. 3 is a simplified diagram illustrating an example BIER sub-domain 300 having at least two BFRs 310, 320 configured in a manner consistent with the present description. More specifically, BFR1 310 and BFR2 320 are configured with a common, non-zero, BIER forwarding router (BRF) identifier (BFR-ID) (namely, BitString position n) associated with a common BFR-prefix (namely, IP address q.r.s.x/32) 315 and 325. The BIER sub-domain 300 may include one or more other BFR(s), such as BFR 330. In this example, BFR 330 has a different BFR-ID (namely BitString position m) and a different BFR-prefix (namely, IP address q.r.s.y/32) 335.

It is expected that in the most common implementation of the BIER sub-domain 300, both BFR1 310 and BFR2 320 will be BIER forwarding egress routers (BFERs). However, this is not required. BFR1 310 and BFR2 320 can be any combination of BFIRs and/or BFERs. Indeed, BFR1 310 and/or BFR2 320 can serve as both a BFIR and a BFER.

Note that although only two BFRs 310 and 320 are illustrated as having a common BFR-ID and a common BFR-prefix, the example BIER sub-domain 300 can have more than such BFRs.

Since BFR1 310 and BFR2 320 share a common BFR-prefix, the common BFR-prefix can be considered to be an Anycast address.

§ 5.1.1 Example Use Cases

Figure 4:
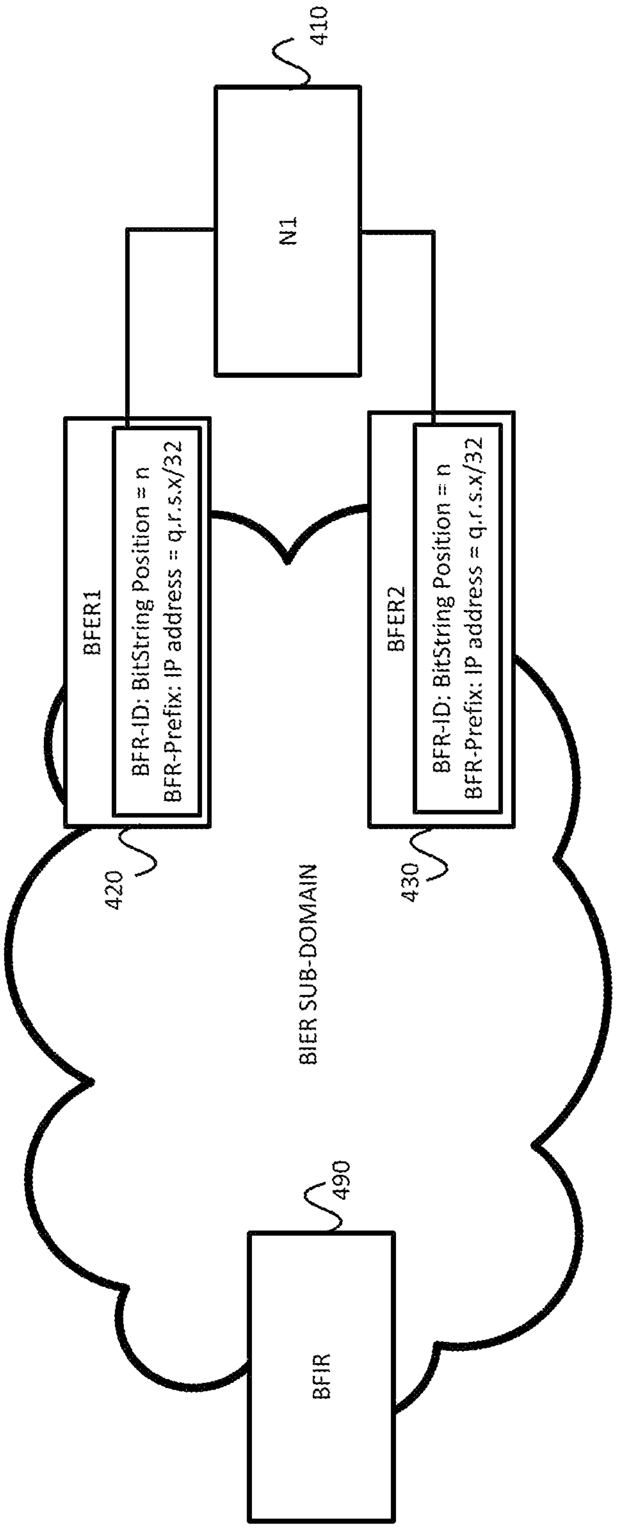
FIGS. 4 and 5 are simplified diagrams illustrating use cases of example embodiments consistent with the present description.
Figure 5:
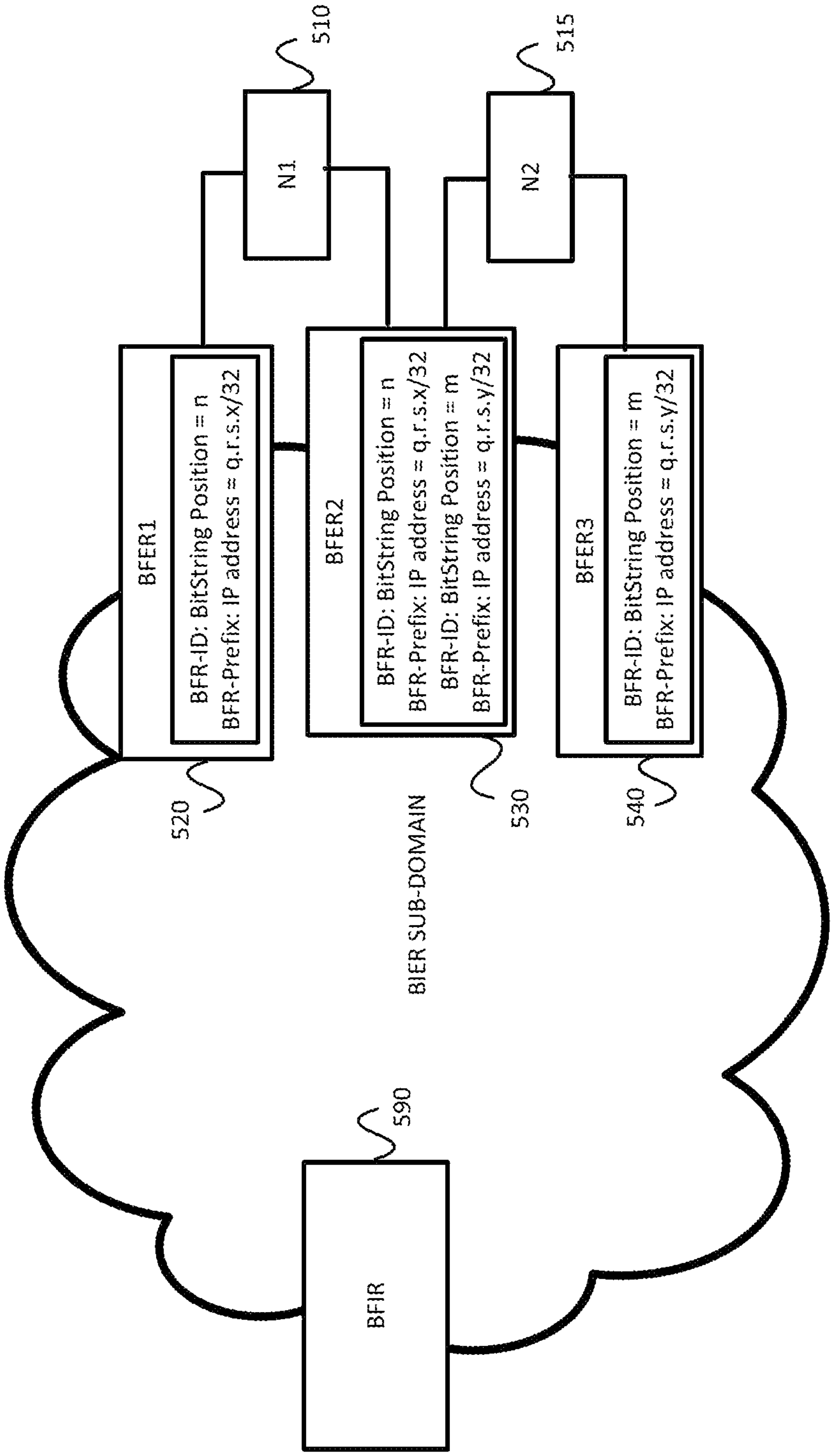

FIGS. 4 and 5 are simplified diagrams illustrating use cases of example embodiments consistent with the present description.

Figure 1:
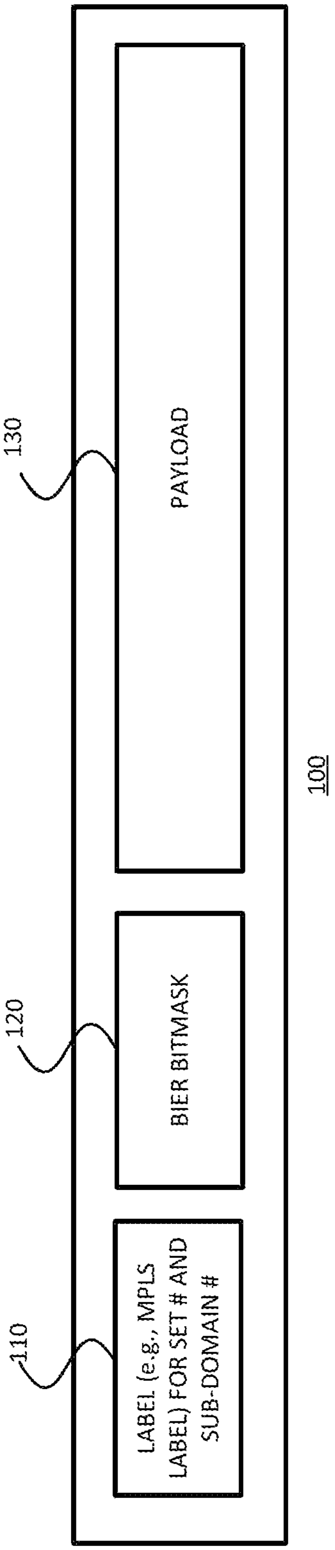
FIG. 1 illustrates an example packet to be forwarded across a BIER domain or sub-domain.
Figure 2:
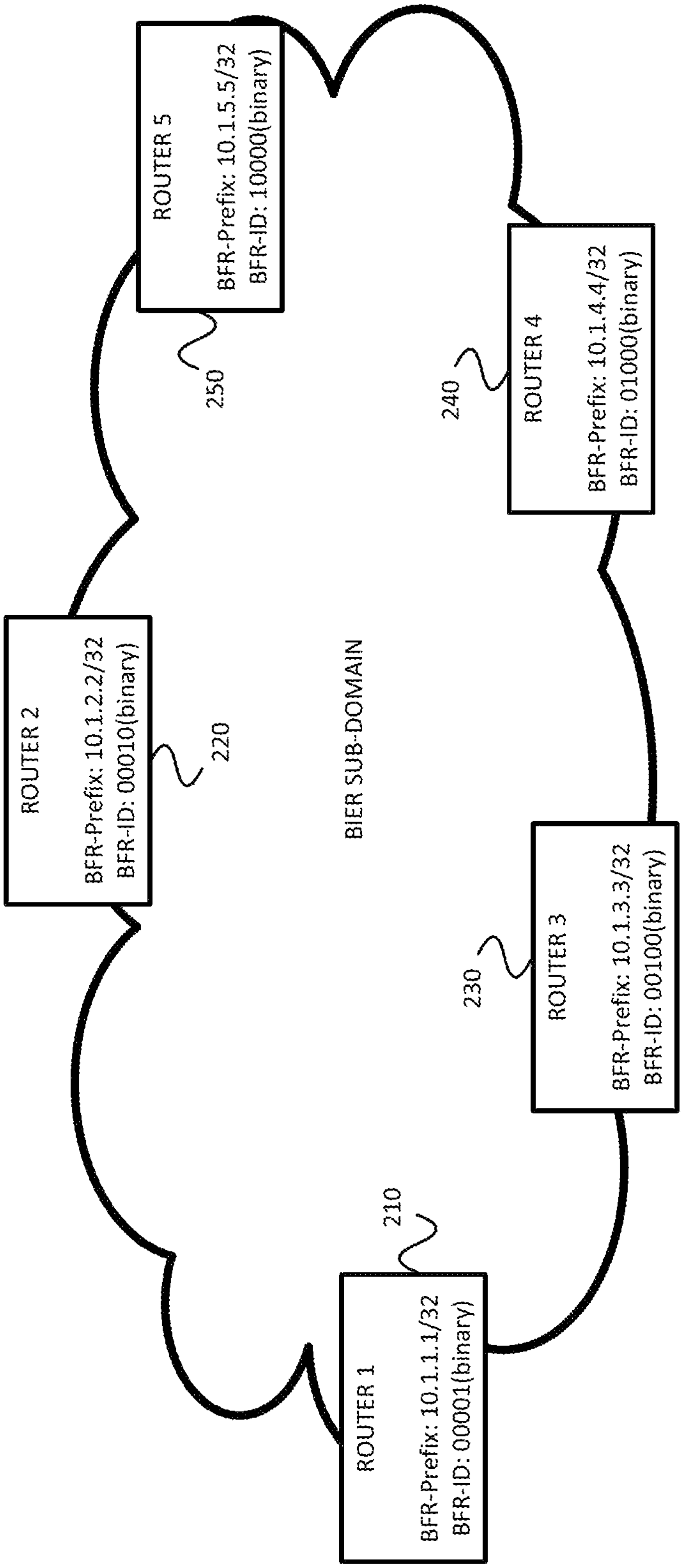
FIG. 2 is a simplified diagram illustrating BFR-IDs and BFR-prefixes.

In a simple egress protection scenario 400 illustrated in FIG. 4, a flow overlay node N1 410 connects to BFER1 420 and BFER2 430 that advertise the same anycast BIER-prefix (IP address=q.r.s.x/32) with the same BFR-ID (Bitstring position=n). Although not shown, BFIR 490 can communicate with BFER1 420 and BFR2 430 via zero or more transit routers (not shown). Similarly, BFER1 420 and BFER2 430 can communicate with one another via zero or more transit routers (not shown). For traffic destined for node N1 410, BFIR 490 can set the bit corresponding to the BFR-ID in the BitString (that is, the $n^{th}$ bit) in the BIER header (Recall field 170 of FIG. 1.) so that the packet is forwarded to either BFER1 420 or BFER2 430. The data delivered to BFER1 420 or BFER2 430 is then decapsulated to remove the BIER header, and the resulting packet is delivered to node N1 410.

In a more complicated scenario 500 illustrated in FIG. 5, a flow overlay node N1 510 may connect to BFER1 520 and BFER2 530, while another node N2 515 may connect to BFER2 530 and BFER3 540. Although not shown, BFIR 590 can communicate with BFER1 520, BFR2 530, and BFR3 540 via zero or more transit routers (not shown). Similarly, BFER1 520, BFER2 530, and BFER3 540 can communicate with one another via zero or more transit routers (not shown). In this case, BFER1 520 and BFER2 530 advertise a common (anycast) BIER-prefix (IP address=q.r.s.x/32) while BFER2 530 and BFER3 540 advertise another common (anycast) BIER-prefix (IP address=q.r.s.y/32). In this case, BFER2 530 advertises two anycast BIER-prefixes (q.r.s.x/32 and q.r.s.y/32) and two corresponding BFR-IDs (BitString positions m and n). Its 530 BIFT (not shown) will have two entries for decapsulation with local forwarding.

Since each unique BFR-prefix needs a unique BFR-ID that takes one bit position in the BitString, a network designer should minimize the use of anycast BFR-prefixes. Limiting egress protection to the first scenario 400 of FIG. 4 where flow overlay nodes are uniformly connected is recommended.

In both examples, there is no need for the BFERs to advertise a non-anycast BFR-prefix(es). However, there may be scenarios where both anycast and non-anycast BFR-prefixes are advertised.

§ 5.2 Example Methods

Figure 6:
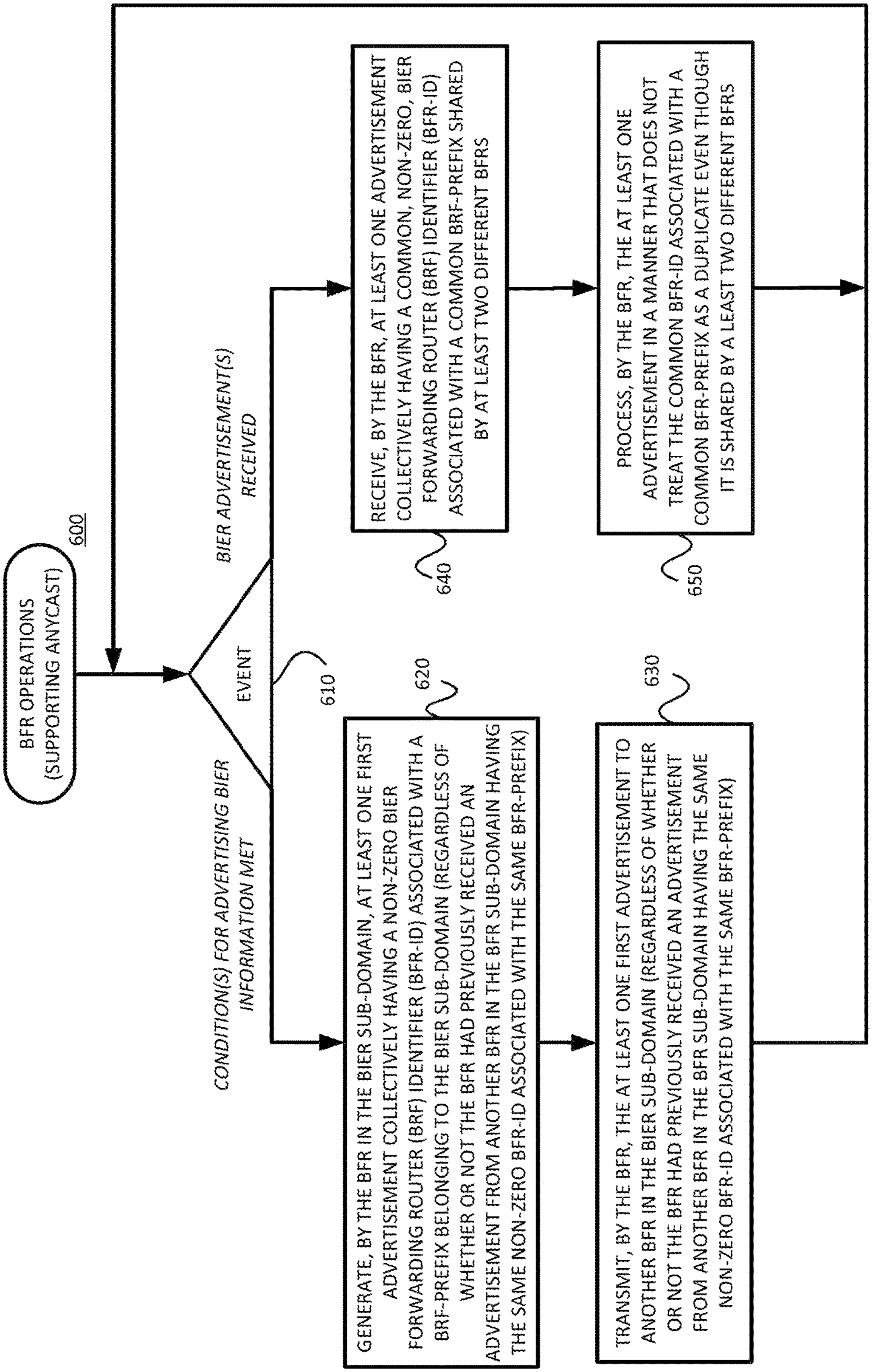
FIG. 6 is a flow diagram of an example method (e.g., for supporting anycast in BIER) consistent with the present description.

FIG. 6 is a flow diagram of an example method 600 (e.g., for supporting Anycast in BFR) consistent with the present description. This example method 600 is performed by each of at least two BFRs in a given BIER sub-domain. Referring to event branch point 610, different branches of the example method 600 are performed in response to the occurrence of different conditions or triggers.

Referring first to the left branch of example method 600, when one or more condition(s) for advertising BIER information is met, the example method 600 generates at least one advertisement collectively having a non-zero BIER forwarding router (BRF) identifier (BFR-ID) associated with a BFR-prefix belonging to the BIER sub-domain (Block 620), and transmits (e.g., via flooding, per RFC 8401 as modified by the present application, per RFC 8444 as modified by the present application, etc.) the at least one advertisement to another BFR in the BIER sub-domain (Block 830). These acts 620 and 630 are performed regardless of whether or not the BFR performing the example method 600 had previously received an advertisement from another BFR in the BFR sub-domain having the same non-zero BFR-ID associated with the same BFR-prefix.

Referring next to the right branch of example method 600, when a BIER advertisement(s) is received having a common, non-zero, BIER forwarding router (BRF) identifier (BFR-ID) associated with a common BRF-prefix shared by at least two different BFRs, the BFR running the example method 600 receives the advertisement(s) (Block 640) and processes the advertisement(s) in a manner that does not treat the common BFR-ID associated with a common BFR-prefix as a duplicate even though it is shared by a least two different BFRs (Block 650).

Referring back to block 650, in some example implementations of the example method 600, the act of processing the at least one advertisement in a manner that does not treat the common BFR-ID associated with a common BFR-prefix as a duplicate even though it is shared by a least two different BFRs includes using, by the BFR, the common, non-zero, BFR-ID and the common BFR-prefix shared by the at least two different BFRs belonging to the BIER sub-domain to calculate BIER routes to the any one of the at least two different BFRs sharing the common, non-zero, BFR-ID and the common BFR-prefix. In at least some such implementations, the act of processing the at least one advertisement in a manner that does not consider the common BFR-ID associated with a common BFR-prefix as a duplicate even though it is shared by a least two different BFRs further includes: generating a bit index forwarding table (BIFT) from the BIRT. Later, when the BFR receives a packet including a label identifying the sub-domain, a destination bit mask, and a payload, wherein the destination bit mask includes a bit-position corresponding to the BFR-ID set to "1", it forwards the packet using the BIFT.

Referring to both FIG. 3 and the left branch of example method 600, assume that BFR1 310 has previously received an advertisement from BFR2 320 with BFR-ID set to Bitstring position n and BFR-prefix set to IP address q.r.s.x/32. When one or more condition(s) for advertising BIER information is met, BFR1 310 generates at least one first advertisement collectively having a non-zero BFR-ID set to Bitstring position n and associated with BFR-prefix set to IP address q.r.s.x/32, regardless of the fact that BFR1 310 had previously received an advertisement(s) from another BFR (namely, BFR2 320) having the same non-zero BFR-ID associated with the same BFR-prefix (Recall Block 620). BFR1 310 then transmits the at least one first advertisement to another BFR in the BIER sub-domain, regardless of the fact that BFR1 310 had previously received an advertisement(s) from another BFR (namely, BFR2) 320 having the same non-zero BFR-ID associated with the same BFR-prefix. (Recall block 630.)

Referring to both FIG. 3 and the right branch of example method 600, assume that BFR 330 is performing the example method 600. Assume further that BFR 330 receives advertisement(s) having a common, non-zero, BIER forwarding router BFR-ID (Bitstring position=n) associated with a common BRF-prefix (IP address=q.r.s.x/32) shared by at least two different BFRs; namely BFR1 310 and BFR2 320. (Recall Block 640.) BFR 330 processes the received advertisement(s) in a manner that does not treat the common BFR-ID associated with a common BFR-prefix as a duplicate even though it is shared by a least two different BFR; namely BFR1 310 and BFR2 320. (Recall block 650).

As should be appreciated by the foregoing, the example method 600 allows anycast in BIER sub-domains.

§ 5.3 Example Apparatus

Figure 7:
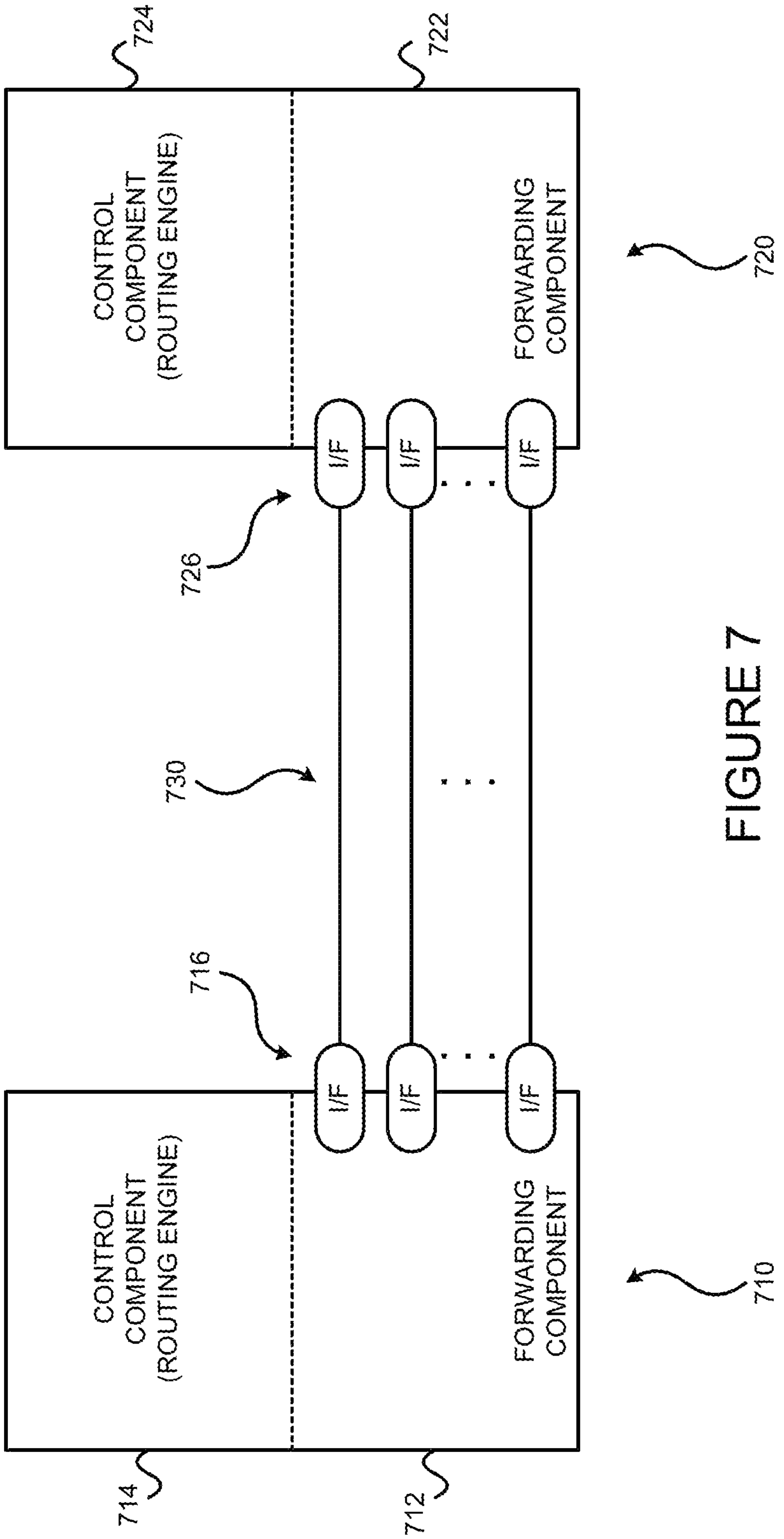
FIG. 7 illustrates two data forwarding systems, which may be used as nodes, coupled via communications links, in a communications network, such as communications network employing BIER.

The data communications network nodes may be forwarding devices, such as routers for example. FIG. 7 illustrates two data forwarding systems 710 and 720 coupled via communications links 730. The links may be physical links or "wireless" links. The data forwarding systems 710,720 may be routers for example. If the data forwarding systems 710,720 are example routers, each may include a control component (e.g., a routing engine) 714,724 and a forwarding component 712,722. Each data forwarding system 710,720 includes one or more interfaces 716,726 that terminate one or more communications links 730.

As just discussed above, and referring to FIG. 8, some example routers 800 include a control component (e.g., routing engine) 810 and a packet forwarding component (e.g., a packet forwarding engine) 890.

The control component 810 may include an operating system (OS) kernel 820, routing protocol process(es) 830, label-based forwarding protocol process(es) 840, interface process(es) 850, user interface (e.g., command line interface) process(es) 860, and chassis process(es) 870, and may store routing table(s) 839, label forwarding information 845, and forwarding (e.g., route-based and/or label-based) table (s) 880. As shown, the routing protocol process(es) 830 may support routing protocols such as the routing information protocol ("RIP") 831, the intermediate system-to-intermediate system protocol ("IS-IS") 832, the open shortest path first protocol ("OSPF") 833, the enhanced interior gateway routing protocol ("EIGRP") 834 and the border gateway protocol ("BGP") 835, and the label-based forwarding protocol process(es) 840 may support protocols such as BGP 835, the label distribution protocol ("LDP") 836, the resource reservation protocol ("RSVP") 837, EVPN 838 and L2VPN 839. One or more components (not shown) may permit a user 865 to interact with the user interface process (es) 860. Similarly, one or more components (not shown) may permit an outside device to interact with one or more of the router protocol process(es) 830, the label-based forwarding protocol process(es) 840, the interface process(es) 850, and the chassis process(es) 870, via SNMP 885, and such processes may send information to an outside device via SNMP 885.

The packet forwarding component 890 may include a microkernel 892 over hardware components (e.g., ASICs, switch fabric, optics, etc.) 891, interface process(es) 893, ASIC drivers 894, chassis process(es) 895 and forwarding (e.g., route-based and/or label-based) table(s) 896.

Figure 8:
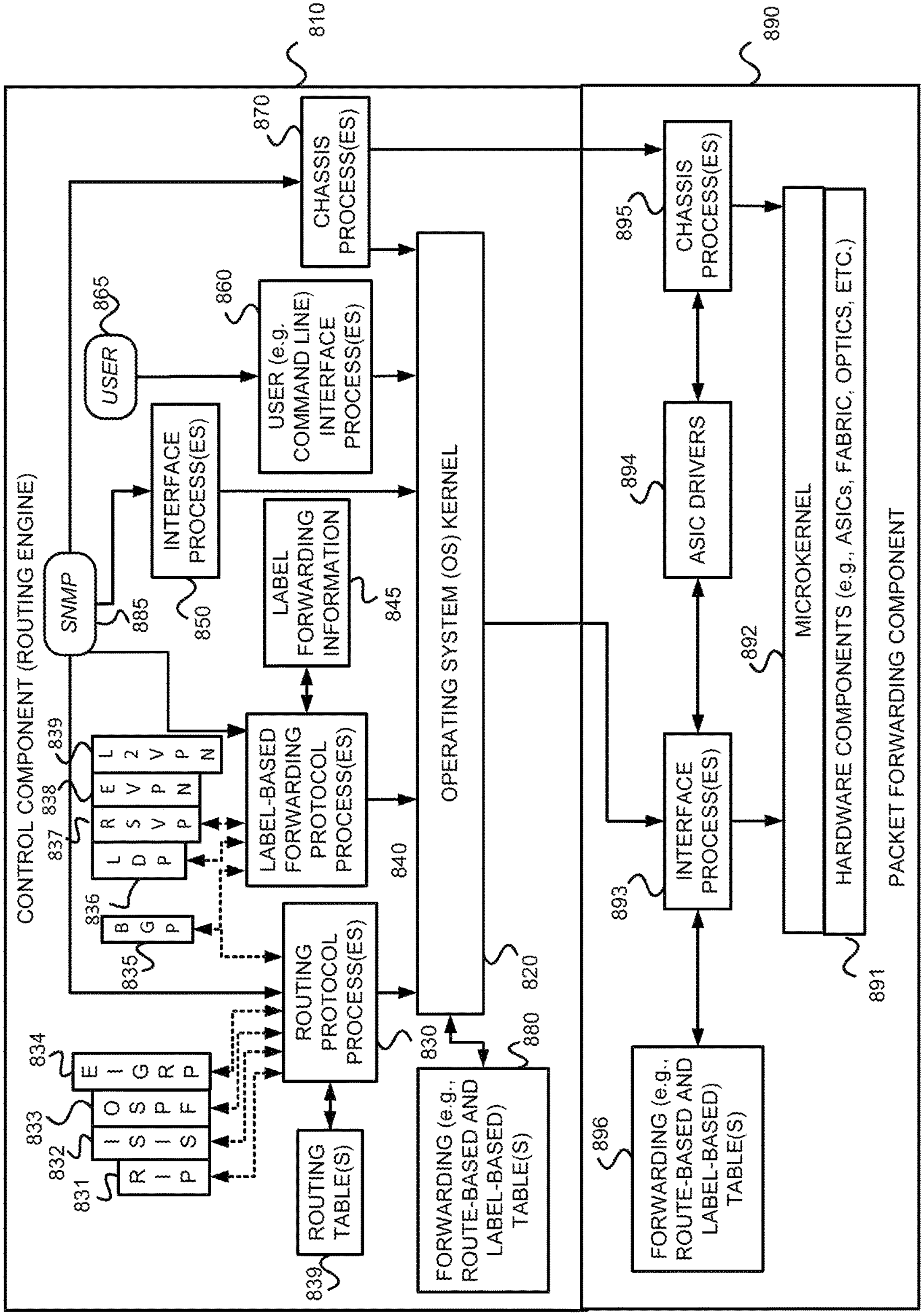
FIG. 8 is a block diagram of a router which may be used a communications network, such as a communications network employing BIER.

In the example router 800 of FIG. 8, the control component 810 handles tasks such as performing routing protocols, performing label-based forwarding protocols, control packet processing, etc., which frees the packet forwarding component 890 to forward received packets quickly. That is, received control packets (e.g., routing protocol packets and/or label-based forwarding protocol packets) are not fully processed on the packet forwarding component 890 itself, but are passed to the control component 810, thereby reducing the amount of work that the packet forwarding component 890 has to do and freeing it to process packets to be forwarded efficiently. Thus, the control component 810 is primarily responsible for running routing protocols and/or label-based forwarding protocols, maintaining the routing tables and/or label forwarding information, sending forwarding table updates to the packet forwarding component 890, and performing system management. The example control component 810 may handle routing protocol packets, provide a management interface, provide configuration management, perform accounting, and provide alarms. The processes 830, 840, 850, 860 and 870 may be modular, and may interact with the OS kernel 820. That is, nearly all of the processes communicate directly with the OS kernel 820. Using modular software that cleanly separates processes from each other isolates problems of a given process so that such problems do not impact other processes that may be running. Additionally, using modular software facilitates easier scaling.

Still referring to FIG. 8, the example OS kernel 820 may incorporate an application programming interface ("API") system for external program calls and scripting capabilities. The control component 810 may be based on an Intel PCI platform running the OS from flash memory, with an alternate copy stored on the router's hard disk. The OS kernel 820 is layered on the Intel PCI platform and establishes communication between the Intel PCI platform and processes of the control component 810. The OS kernel 820 also ensures that the forwarding tables 896 in use by the packet forwarding component 890 are in sync with those 880 in the control component 810. Thus, in addition to providing the underlying infrastructure to control component 810 software processes, the OS kernel 820 also provides a link between the control component 810 and the packet forwarding component 890.

Referring to the routing protocol process(es) 830 of FIG. 8, this process(es) 830 provides routing and routing control functions within the platform. In this example, the RIP 831, ISIS 832, OSPF 833 and EIGRP 834 (and BGP 835) protocols are provided. Naturally, other routing protocols may be provided in addition, or alternatively. Similarly, the label-based forwarding protocol process(es) 840 provides label forwarding and label control functions. In this example, the LDP 836, RSVP 837, EVPN 838 and L2VPN 839 (and BGP 835) protocols are provided. Naturally, other label-based forwarding protocols (e.g., MPLS, SR, etc.) may be provided in addition, or alternatively. In the example router 800, the routing table(s) 839 is produced by the routing protocol process(es) 830, while the label forwarding information 845 is produced by the label-based forwarding protocol process(es) 840.

Still referring to FIG. 8, the interface process(es) 850 performs configuration of the physical interfaces and encapsulation.

The example control component 810 may provide several ways to manage the router. For example, it 810 may provide a user interface process(es) 860 which allows a system operator 865 to interact with the system through configuration, modifications, and monitoring. The SNMP 885 allows SNMP-capable systems to communicate with the router platform. This also allows the platform to provide necessary SNMP information to external agents. For example, the SNMP 885 may permit management of the system from a network management station running software, such as Hewlett-Packard's Network Node Manager ("HP-NNM"), through a framework, such as Hewlett-Packard's Open View. Accounting of packets (generally referred to as traffic statistics) may be performed by the control component 810, thereby avoiding slowing traffic forwarding by the packet forwarding component 890.

Although not shown, the example router 800 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 860 via a console port, an auxiliary port, and/or a management Ethernet port.

The packet forwarding component 890 is responsible for properly outputting received packets as quickly as possible. If there is no entry in the forwarding table for a given destination or a given label and the packet forwarding component 890 cannot perform forwarding by itself, it 890 may send the packets bound for that unknown destination off to the control component 810 for processing. The example packet forwarding component 890 is designed to perform Layer 2 and Layer 3 switching, route lookups, and rapid packet forwarding.

As shown in FIG. 8, the example packet forwarding component 890 has an embedded microkernel 892 over hardware components 891, interface process(es) 893, ASIC drivers 894, and chassis process(es) 895, and stores a forwarding (e.g., route-based and/or label-based) table(s) 896. The microkernel 892 interacts with the interface process(es) 893 and the chassis process(es) 895 to monitor and control these functions. The interface process(es) 892 has direct communication with the OS kernel 820 of the control component 810. This communication includes forwarding exception packets and control packets to the control component 810, receiving packets to be forwarded, receiving forwarding table updates, providing information about the health of the packet forwarding component 890 to the control component 810, and permitting configuration of the interfaces from the user interface (e.g., CLI) process(es) 860 of the control component 810. The stored forwarding table (s) 896 is static until a new one is received from the control component 810. The interface process(es) 893 uses the forwarding table(s) 896 to look up next-hop information. The interface process(es) 893 also has direct communication with the distributed ASICs. Finally, the chassis process(es) 895 may communicate directly with the microkernel 892 and with the ASIC drivers 894.

Figure 9:
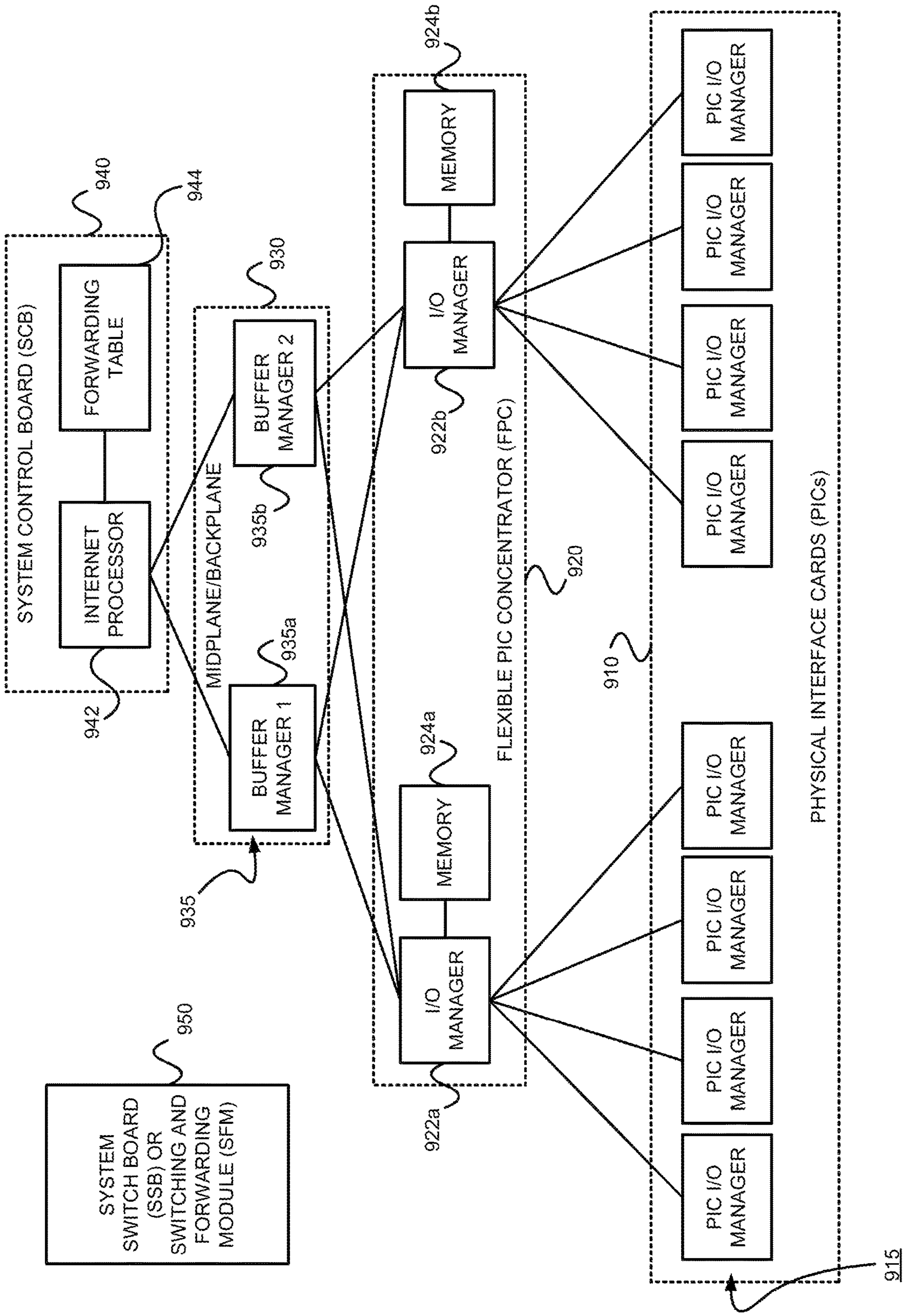
FIG. 9 is an example architecture in which ASICS may be distributed in a packet forwarding component to divide the responsibility of packet forwarding.
Figure 10A:
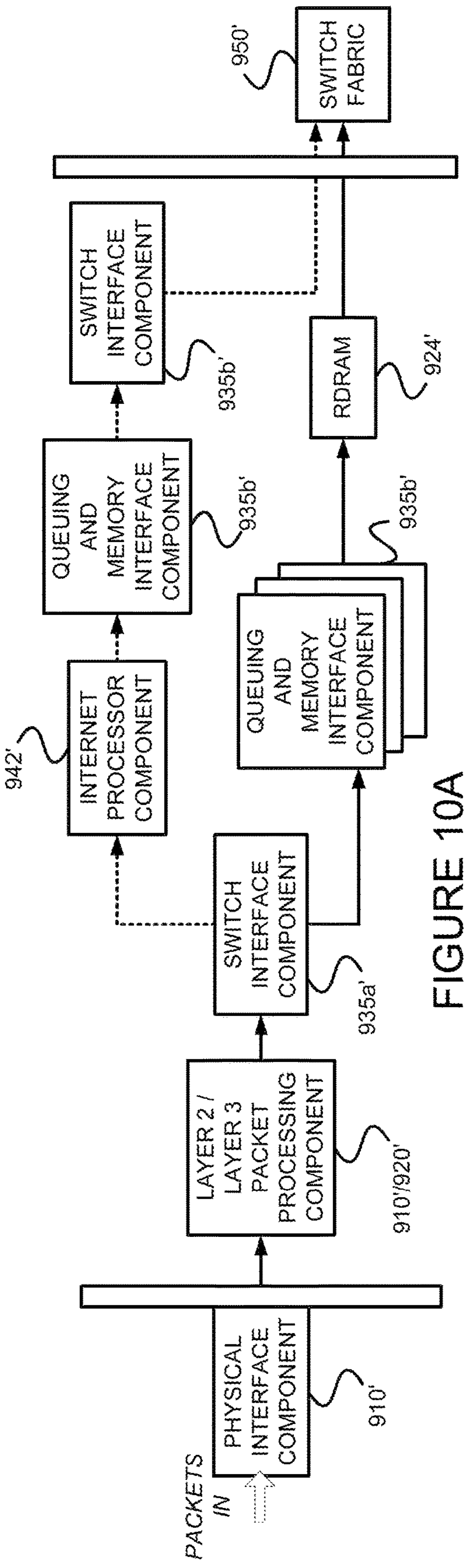
FIGS. 10A and 10B is an example of operations of the example architecture of FIG. 9.
Figure 10B:
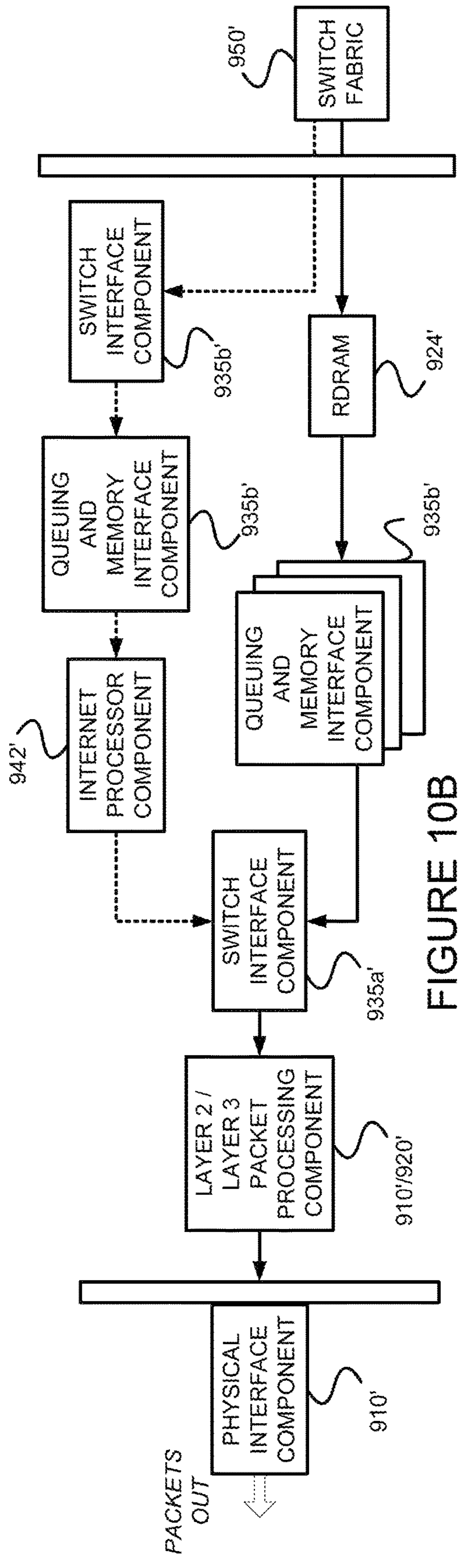

FIG. 9 is an example of how the ASICS may be distributed in the packet forwarding component 890 to divide the responsibility of packet forwarding. As shown in FIG. 9, the ASICs of the packet forwarding component 890 may be distributed on physical interface cards ("PICs") 910, flexible PIC concentrators ("FPCs") 920, a midplane or backplane 930, and a system control board(s) 940 (for switching and/or forwarding). Switching fabric is also shown as a system switch board ("SSB"), or a switching and forwarding module ("SFM") 950 (which may be a switch fabric 950' as shown in FIGS. 10A and 10B). Each of the PICs 910 includes one or more PIC I/O managers 915. Each of the FPCs 920 includes one or more I/O managers 922, each with an associated memory 924 (which may be a RDRAM 924' as shown in FIGS. 10A and 10B). The midplane/backplane 930 includes buffer managers 935*a*, 935*b*. Finally, the system control board 940 includes an internet processor 942 and an instance of the forwarding table 944 (Recall, e.g., 896 of FIG. 8).

Still referring to FIG. 9, the PICs 910 contain the interface ports. Each PIC 910 may be plugged into an FPC 920. Each individual PIC 910 may contain an ASIC that handles media-specific functions, such as framing or encapsulation. Some example PICs 910 provide SDH/SONET, ATM, Gigabit Ethernet, Fast Ethernet, and/or DS3/E3 interface ports.

An FPC 920 can contain one or more PICs 910, and may carry the signals from the PICS 910 to the midplane/backplane 930 as shown in FIG. 9.

The midplane/backplane 930 holds the line cards. The line cards may connect into the midplane/backplane 930 when inserted into the example router's chassis from the front. The control component (e.g., routing engine) 810 may plug into the rear of the midplane/backplane 930 from the rear of the chassis. The midplane/backplane 930 may carry electrical (or optical) signals and power to each line card and to the control component 810.

The system control board 940 may perform forwarding lookup. It 940 may also communicate errors to the routing engine. Further, it 940 may also monitor the condition of the router based on information it receives from sensors. If an abnormal condition is detected, the system control board 940 may immediately notify the control component 810.

Referring to FIGS. 9, 10A and 10B, in some exemplary routers, each of the PICS 910,910' contains at least one I/O manager ASIC 915 responsible for media-specific tasks, such as encapsulation. The packets pass through these I/O ASICs on their way into and out of the router. The I/O manager ASIC 915 on the PIC 910, 10' is responsible for managing the connection to the I/O manager ASIC 922 on the FPC 920,920', managing link-layer framing and creating the bit stream, performing cyclical redundancy checks (CRCs), and detecting link-layer errors and generating alarms, when appropriate. The FPC 920 includes another I/O manager ASIC 922. This ASIC 922 (shown as a layer 2/layer 3 packet processing component 910'/920') takes the packets from the PICs 910 and breaks them into (e.g., 74-byte) memory blocks. This FPC I/O manager ASIC 922 (shown as a layer 2/layer 3 packet processing component 910'/920') sends the blocks to a first distributed buffer manager (DBM) 935*a* (shown as switch interface component 935*a'*), decoding encapsulation and protocol-specific information, counting packets and bytes for each logical circuit, verifying packet integrity, and applying class of service (CoS) rules to packets. At this point, the packet is first written to memory. More specifically, the example DBM ASIC 935/935*a'* manages and writes packets to the shared memory 924 across all FPCs 920. In parallel, the first DBM ASIC 935/935*a'* also extracts information on the destination of the packet and passes this forwarding-related information to the Internet processor 942/942'. The Internet processor 942/942' performs the route lookup using the forwarding table 944 and sends the information over to a second DBM ASIC 935*b'*. The Internet processor ASIC 942/942' also collects exception packets (i.e., those without a forwarding table entry) and sends them to the control component 810. The second DBM ASIC 925 (shown as a queuing and memory interface component 935*b'*) then takes this information and the 74-byte blocks and forwards them to the I/O manager ASIC 922 of the egress FPC 920/920' (or multiple egress FPCs, in the case of multicast) for reassembly. (Thus, the DBM ASICs 935*a*/935*a'* and 935*b*/935*b'* are responsible for managing the packet memory 924/924' distributed across all FPCs 920/920', extracting forwarding-related information from packets, and instructing the FPC where to forward packets.)

The I/O manager ASIC 922 on the egress FPC 920/920' may perform some value-added services. In addition to incrementing time to live ("TTL") values and re-encapsulating the packet for handling by the PIC 910, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 922 on the egress FPC 920/920' may be responsible for receiving the blocks from the second DBM ASIC 935/935', incrementing TTL values, queuing a pointer to the packet, if necessary, before applying CoS rules, re-encapsulating the blocks, and sending the encapsulated packets to the PIC I/O manager ASIC 915.

Figure 11:
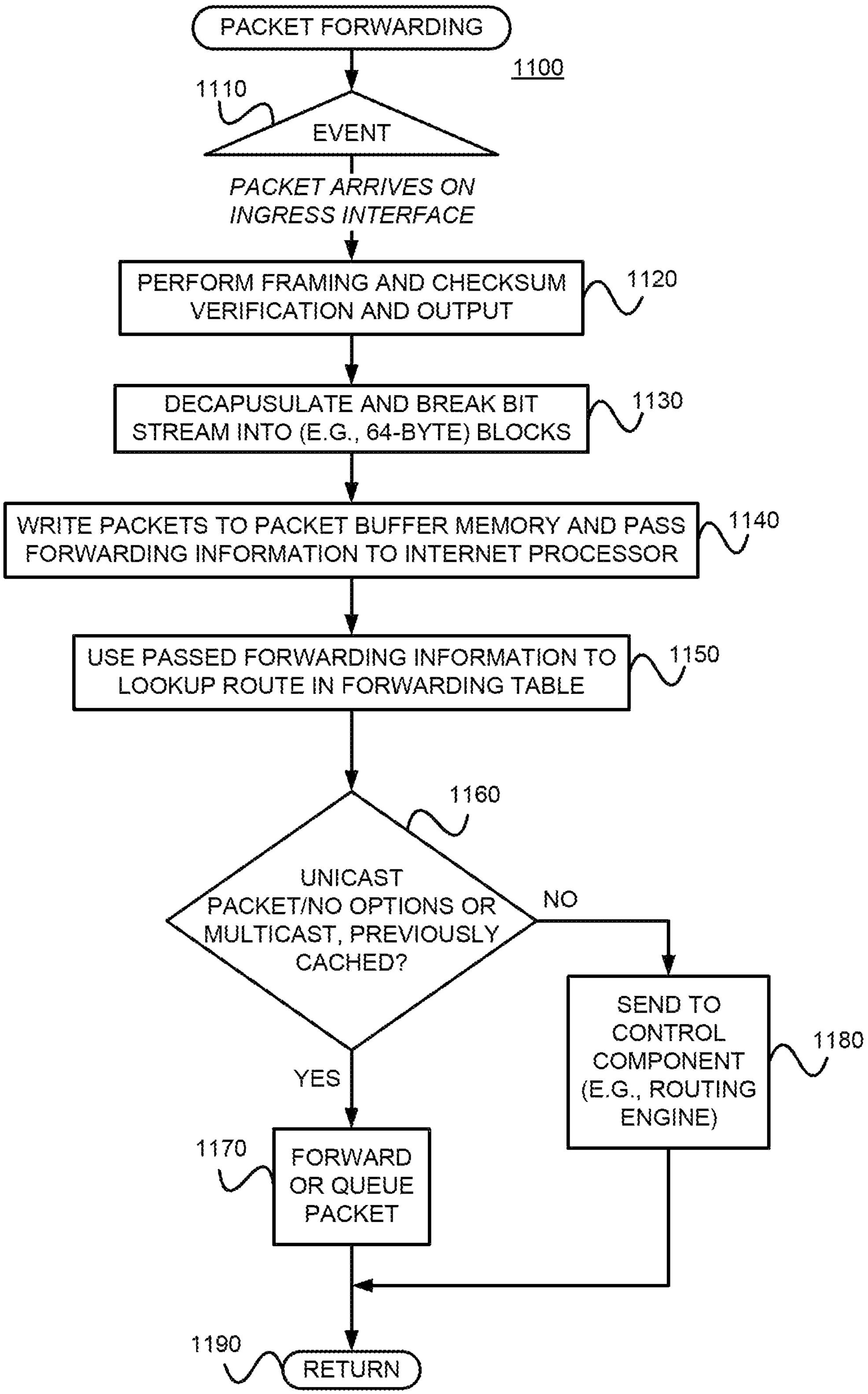
FIG. 11 is a flow diagram of an example method for providing packet forwarding in an example router.

FIG. 11 is a flow diagram of an example method 1100 for providing packet forwarding in the example router. The main acts of the method 1100 are triggered when a packet is received on an ingress (incoming) port or interface. (Event 1110) The types of checksum and frame checks that are required by the type of medium it serves are performed and the packet is output, as a serial bit stream. (Block 1120) The packet is then decapsulated and parsed into (e.g., 64-byte) blocks. (Block 1130) The packets are written to buffer memory and the forwarding information is passed on the Internet processor. (Block 1140) The passed forwarding information is then used to lookup a route in the forwarding table. (Block 1150) Note that the forwarding table can typically handle unicast packets that do not have options (e.g., accounting) set, and multicast packets for which it already has a cached entry. Thus, if it is determined that these conditions are met (YES branch of Decision 1160), the packet forwarding component finds the next hop and egress interface, and the packet is forwarded (or queued for forwarding) to the next hop via the egress interface (Block 1170) before the method 1100 is left (Node 1190) Otherwise, if these conditions are not met (NO branch of Decision 1160), the forwarding information is sent to the control component 810 for advanced forwarding resolution (Block 1180) before the method 1100 is left (Node 1190).

Referring back to block 1170, the packet may be queued. Actually, as stated earlier with reference to FIG. 9, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 922 may send a request for the packet to the second DBM ASIC 935*b*. The DBM ASIC 935 reads the blocks from shared memory and sends them to the I/O manager ASIC 922 on the FPC 920, which then serializes the bits and sends them to the media-specific ASIC of the egress interface. The I/O manager ASIC 915 on the egress PIC 910 may apply the physical-layer framing, perform the CRC, and send the bit stream out over the link.

Referring back to block 1180 of FIG. 11, as well as FIG. 9, regarding the transfer of control and exception packets, the system control board 940 handles nearly all exception packets. For example, the system control board 940 may pass exception packets to the control component 810.

Although example embodiments consistent with the present description may be implemented on the example routers of FIG. 7 or 8, embodiments consistent with the present description may be implemented on communications network nodes (e.g., routers, switches, etc.) having different architectures. More generally, embodiments consistent with the present description may be implemented on an example system 1200 as illustrated on FIG. 12.

Figure 12:
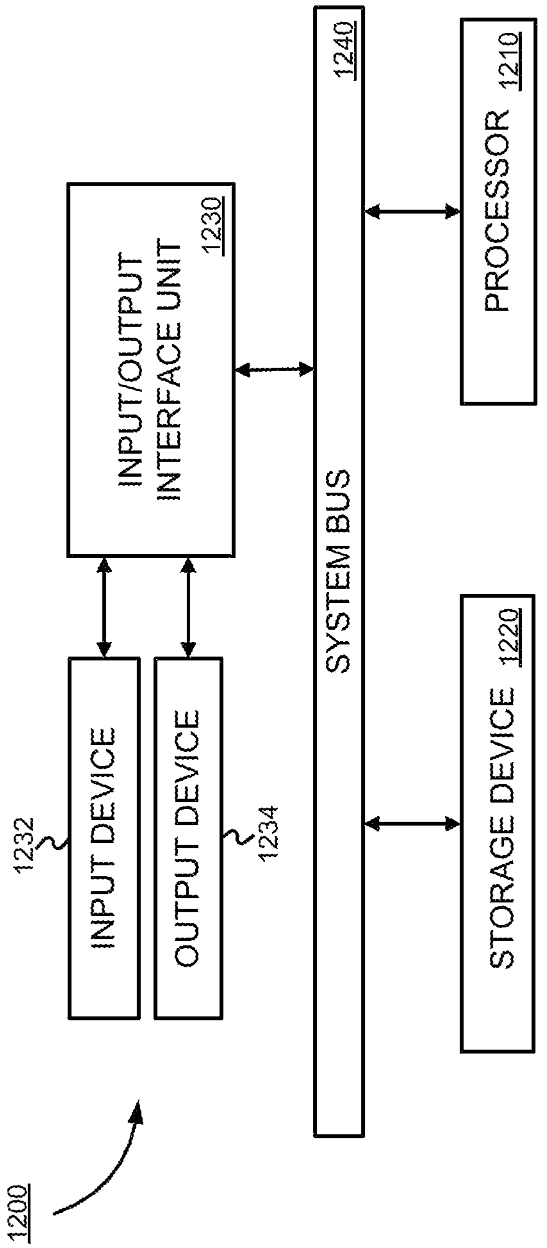
FIG. 12 is a block diagram of an exemplary machine that may perform one or more of the processes described, and/or store information used and/or generated by such processes.

FIG. 12 is a block diagram of an exemplary machine 1200 that may perform one or more of the processes described, and/or store information used and/or generated by such processes. The exemplary machine 1200 includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230. The one or more processors 1210 may execute machine-executable instructions (e.g., C or C++ running on the Linux operating system widely available from a number of vendors) to perform one or more aspects of the present description. At least a portion of the machine executable instructions may be stored (temporarily or more permanently) on the one or more storage devices 1220 and/or may be received from an external source via one or more input interface units 1230. The machine executable instructions may be stored as various software modules, each module performing one or more operations. Functional software modules are examples of components of the present description.

In some embodiments consistent with the present description, the processors 1210 may be one or more microprocessors and/or ASICs. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMS, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 5.4 Refinements, Alternatives, and/or Extensions

Each BFR-prefix in a BIER sub-domain has a unique BFR-ID.

When a BIER signaling protocol checks for and logs duplicated BFR-IDs in routing advertisements, only the same BFR-ID advertised with different BFR-prefixes is considered as "duplicate." The same BFR-prefix may be advertised by different BFRs, but they all advertise the same BFR-ID.

It is recommended that only BFERs advertise anycast BFR-prefixes. A transit BFR (with BFR-ID set to 0) should not advertise anycast BFR-prefixes, though the only consequence of doing so is additional useless advertisement.

A BFER may advertise one non-anycast BIER-prefix and may advertise one or more anycast BFR-prefixes. Multiple BFERs may advertise the same anycast BFR-prefix. The same BFR-prefixes are advertised with the same BFR-ID.

As noted in the background section above, a BFER may be a BFIR at the same time. If a BFIR advertises one or more anycast BFR-prefixes, it uses the BFD-ID associated with its non-anycast BFR-prefix in the BIER header that it imposes.

The inventor regards the invention as any patentable subject matter described in this application. The invention is not intended to be limited to any specific embodiments described.

§ 5.5 Conclusions

Example embodiments consistent with the present description allow BIER sub-domains to support anycast.

What is claimed is:

1. A Bit Index Explicit Replication (BIER) sub-domain comprising:

at least two BIER forwarding routers (BFRs) configured with a shared, non-zero, BIER forwarding router (BFR) identifier (BFR-ID) associated with a shared BFR-prefix, wherein the shared BFR-prefix of the at least two BFRs is an anycast address, whereby a packet transmitted to the anycast address is delivered to any one of the at least two BFRs, and wherein at least one of the at least two BFRs belongs to a single BFR subdomain.

2. A computer-implemented method comprising:

a) receiving, by a Bit Index Explicit Replication (BIER) forwarding router (BFR) in a BIER sub-domain, at least one advertisement collectively having a first, non-zero, BIER forwarding router (BFR) identifier (BFR-ID) for the BIER sub-domain, associated with a first BFR-prefix, wherein the BFR-ID is shared by at least two different BFRs in the BIER sub-domain; and b) processing the at least one advertisement by not treating the first BFR-ID for the BIER sub-domain, associated with the first BFR-prefix as a duplicate and does not log an error or ignore the duplicate shared BFR-ID regardless of whether or not the BFR had previously received at least one advertisement from another BFR in the BFR sub-domain having the same non-zero BFR-ID associated with the same BFR-prefix, without any intervening check of whether or not the at least one advertisement includes an anycast indicator since the shared BFR-prefix is presumed to be an Anycast address.

3. The computer-implemented method of claim 2 wherein the act of processing the at least one advertisement by not treating the first BFR-ID for the BIER sub-domain, associated with the first BFR-prefix as a duplicate regardless of whether or not the BER had previously received at least one advertisement from another BFR in the BFR sub-domain having the same non-zero BFR-ID associated with the same BFR-prefix includes using, by the BFR, the first, non-zero, BFR-ID and the first BFR-prefix shared by the at least two different BFRs belonging to the BIER sub-domain to calculate BIER routes to the any one of the at least two different BFRs sharing the first, non-zero, BFR-ID and the first BFR-prefix.

4. The computer-implemented method of claim 2, wherein the at least one advertisement is received from a BIER forwarding ingress router (BFIR) that has a separate BFR-ID associated with a non-Anycast BFR prefix.

5. A Bit Index Explicit Replication (BIER) forwarding router (BFR) in a BIER sub-domain, the BFR comprising:

a) a least one processor; and b) a non-transitory storage device storing processor-executable instructions which, when executed by the at least one processor, cause the at least one processor to:

1) receive, by the BFR, at least one advertisement collectively having a first, non-zero, BIER forwarding router (BFR) identifier (BFR-ID) for the BIER sub-domain, associated with a first BFR prefix, wherein the BFR-ID is shared by at least two different BFRs in the BIER sub-domain; and 2) process the at least one advertisement by not treating the shared first BFR-ID for the BIER sub-domain, associated with the shared first BFR-prefix as a duplicate and does not log an error or ignore the duplicate shared BFR-ID regardless of whether or not the BER had previously received at least one advertisement from another BFR in the BFR sub-domain having the same non-zero BFR-ID associated with the same BFR-prefix, without any intervening check of whether or not the at least one advertisement includes an anycast indicator since the shared BFR-prefix is presumed to be an Anycast address.

6. The Bit Index Explicit Replication (BIER) forwarding router (BFR) of claim 5 wherein the at least one advertisement is received from a BIER forwarding ingress router (BFIR) that has a separate BFR-ID associated with a non-Anycast BFR prefix.

7. A non-transitory storage device storing processor-executable instructions which, when executed by at least one processor of a Bit Index Explicit Replication (BIER) forwarding router (BFR) in a BIER sub-domain, cause the at least one processor to:

a) receive, by the BFR, at least one advertisement collectively having a first, non-zero, BIER forwarding router (BFR) identifier (BFR-ID) for the BIER sub-domain, associated with a first BFR-prefix, wherein the BER-ID is shared by at least two different BFRs in the BIER sub-domain; and b) process the at least one advertisement by not treating the shared first BFR-ID for the BIER sub-domain, associated with the shared first BFR-prefix as a duplicate and does not log an error or ignore the duplicate shared BFR-ID regardless of whether or not the BFR had previously received at least one advertisement from another BFR in the BFR sub-domain having the same non-zero BFR-ID associated with the same BFR-prefix, without any intervening check of whether or not the at least one advertisement includes an anycast indicator since the shared BFR-prefix is presumed to be an Anycast address.

8. The non-transitory storage device of claim 7, wherein the at least one advertisement is received from a BIER forwarding ingress router (BFIR) that has a separate BFR-ID associated with a non-Anycast BFR prefix.

9. A computer-implemented method comprising:

a) generating, by a first BFR in a Bit Index Explicit Replication (BIER) sub-domain, at least one first advertisement collectively having a non-zero BIER forwarding router (BFR) identifier (BFR-ID) for the BIER sub-domain, associated with a BFR-prefix belonging to the BIER sub-domain;

b) transmitting, by the first BFR, the at least one first advertisement to a BFR in the BIER sub-domain other than the first BFR;

c) generating, by a second BFR in the BIER subdomain, at least one second advertisement collectively having the non-zero BIER forwarding router (BFR) identifier (BFR-ID) for the BIER sub-domain, associated with the BFR-prefix belonging to the BIER sub-domain; and d) transmitting, by the second BFR, the at least one second advertisement to a BFR in the BIER sub-domain other than the second BFR, wherein the BFR-prefix of the at least two BFRs is an anycast address, whereby a packet transmitted to the anycast address is delivered to any one of the first and second BERS, and wherein at least one of the first BFR and the second BFR belongs to a single BFR subdomain.

10. The computer-implemented method of claim 9, wherein each of the first BFR and the second BFR is an egress BFR (BFER).

11. The computer-implemented method of claim 6 wherein the acts of (1) generating, by a first BFR in the BIER subdomain, at least one first advertisement collectively having a non-zero BIER forwarding router (BFR) identifier (BFR-ID) for the BIER sub-domain, associated with a BFR-prefix belonging to the BIER sub-domain, and (2) transmitting, by the first BFR, the at least one first advertisement to the BFR in the BIER sub-domain other than the first BFR, are performed regardless of whether or not the first BFR had previously received an advertisement from another BFR in the BFR sub-domain having the non-zero BFR-ID for the BIER sub-domain, associated with the BFR-prefix, and wherein the shared BFR-prefix in the at least one first advertisement and in the at least one second advertisement is presumed to be an Anycast address.

12. The computer-implemented method of claim 9 wherein the act of transmitting, by the first BFR, the at least one first advertisement to the BFR in the BIER sub-domain other than the first BFR, uses flooding.

13. The computer-implemented method of claim 9 wherein the act of transmitting, by the first BFR, the at least one first advertisement to the BFR in the BIER sub-domain other than the first BFR, uses an interior gateway protocol (IGP).

14. The computer-implemented method of claim 9, wherein the first BFR is a BIER forwarding ingress router (BFIR) that has a separate BFR-ID associated with a non-Anycast BFR prefix.

15. A BIER subdomain comprising:

a) a first Bit Index Explicit Replication (BIER) forwarding router (BFR) in the BIER sub-domain, the first BFR including (i) at least one first processor, and (ii) a first non-transitory storage device storing processor-executable instructions which, when executed by the at least one first processor, cause the at least one first processor to:

1) generate, by the first BFR in the BIER subdomain, at least one first advertisement collectively having a non-zero BIER forwarding router (BFR) identifier (BFR-ID) for the BIER sub-domain, associated with a BFR-prefix belonging to the BIER sub-domain;

2) Transmit, by the first BFR, the at least one first advertisement to a BFR in the BIER sub-domain other than the first BFR; and b) a second BFR in the BIER sub-domain, the second BFR including (i) at least one second processor, and (ii) a second non-transitory storage device storing processor-executable instructions which, when executed by the at least one second processor, cause the at least one second processor to:

1) generate, by a second BFR in the BIER subdomain, at least one second advertisement collectively having the non-zero BIER forwarding router (BFR) identifier (BFR-ID) for the BIER sub-domain, associated with the BFR-prefix belonging to the BIER sub-domain; and 2) transmit, by the second BFR, the at least one second advertisement to a BFR in the BIER sub-domain other than the second BFR, wherein the BFR-prefix shared by the first and second BFRs is an anycast address, whereby a packet transmitted to the anycast address is delivered to any one of the first and second BFRs, and wherein at least one of the first BFR and the second BFR belongs to a single BFR subdomain.

16. The BIER subdomain of claim 15, wherein each of the first BFR and the second BFR is an egress BFR (BFER).

17. The BIER subdomain of claim 15, wherein the acts of (1) generating, by a first BFR in the BIER subdomain, at least one first advertisement collectively having a non-zero BIER forwarding router (BFR) identifier (BFR-ID) for the BIER sub-domain, associated with a BFR-prefix belonging to the BIER sub-domain, and (2) transmitting, by the first BFR, the at least one first advertisement to the BFR in the BIER sub-domain other than the first BFR, are performed regardless of whether or not the first BFR had previously received an advertisement from another BFR in the BFR sub-domain having the non-zero BFR-ID for the BIER sub-domain, associated with the BFR-prefix, and wherein the shared BFR-prefix in the at least one first advertisement and in the at least one second advertisement is presumed to be an Anycast address.

18. The BIER subdomain of claim 15, wherein the act of transmitting, by the first BFR, the at least one first advertisement to the BFR in the BIER sub-domain other than the first BFR, uses flooding.

19. The BIER subdomain of claim 15, wherein the act of transmitting, by the first BFR, the at least one first advertisement to the BFR in the BIER sub-domain other than the first BFR, uses an interior gateway protocol (IGP).

20. The BIER subdomain of claim 15, wherein the first BFR is a BIER forwarding ingress router (BFIR) that has a separate BFR-ID associated with a non-Anycast BFR prefix.

* * * * *